Patented Apr. 13, 1943

2,316,535

UNITED STATES PATENT OFFICE 2,316,535

PROCESS FOR THE PRODUCTION OF PIGMENT-CONTAINING PRODUCTS

Georg Böhner, Edingen-on-the-Neckar, Bruno Wendt, Dessau, and John Eggert, Leipzig, Germany; vested in the Alien Property Custodian No Drawing. Application June 8, 1940, Serial No. 339,572. In Germany May 3, 1939

6 Claims. (Cl. 106—308)

This invention relates to the production of products containing pigments.

Fine dispersions of insoluble substances are of great importance for many technical purposes, especially for the industries of synthetic resins, the photographic industry, dye- and print-works, partly also for remedies.

In the process already known the pigment is brought with the aid of stirring machines, ball- or colloid-mills or other dispersing means into a state of as fine a division as possible and this powder is stirred into solutions being mostly of colloidal character, as for instance artificial silk spinning solutions, gelatin solutions or ointment bases. According to other methods the pigment is pulverized in the presence of the colloid or of an auxiliary material, as for instance sugar, prepared or precipitated in the presence of a colloid from any state of solution, or there is won by an intense mechanical treatment from the pigment and its carrier a plastic mass capable of being kneaded and rolled, which, if necessary, by using a small portion of a liquid, finally yields an extremely fine dispersion of the pigment by intense kneading or rolling in the plastic state. Until now aqueous solutions of dextrines, gelatin, water glass (E. P. 473,058) or of sulfite-cellulose-waste-liquor condensation products of aromatic sulfo acids with low aliphatic aldehydes, corresponding to the U. S. Patent application Ser. No. 239,318, filed November 7, 1938, serve as dispersing agents.

It is an object of this invention to produce pigments of highest dispersion.

Another object is to produce this fine state of division by special treatment with new and useful colloidal carriers.

These and other objects will become apparent from the detailed specification following hereinafter.

This invention is based on the observation that there are employed as a dispersing-agent liquid to viscous di- or higher polyhydric alcohols with two or more C-atoms and/or their condensation products obtained by polymerization of two or more molecules. Also mixtures of several of such compounds are useful. There is especially suitable a technical waste product which consists chiefly of triols and tetrols of hexane and octane and contains preferably 1,3,5-trihydroxyhexane and 1,3,5,7-tetrahydroxyhexane in different mixing proportions not being of principle importance for the grinding process itself. These products consist of thick liquids which exced glycerol as far as viscosity is concerned and do not possess its strong hygroscopicity. It is miscible with water and organic solvents which, compared with the dispersing-agents mentioned above, has the advantage that the products, according to requirements, may be further used in water or aqueous colloid solutions or in corresponding organic solvents. The product furthermore, contrary to many other dispersing-agents hitherto used, is colorless, photographically inert and not influenced by air and light. It is able to take up quantities of pigments which are often far greater than its own weight, especially as it is still effective in dilutions with water or organic solvents. This substance has most probably also the ability to soften the grain of the pigment which facilitates the crushing thereof, and to divide agglomerations so extensively that an extremely fine dispersion of the pigment is obtained. Quite often particle sizes below the wave lengths of the light were obtained, so that dispersions of the pigment in water are like true solutions clear to the eye. The pigment is also no longer microscopically detectable.

Also with regard to inorganic pigments like pyrolusite and the like it is more effective to use the product combined with gelatin than to use gelatin alone, i. e. finer dispersions are obtained, when the product is added to gelatin, while kneading, also when it is used by itself, diluted with water or undiluted.

The pigments capable of being kneaded or rolled with the alcohols mentioned above or with the technical alcohol-mixture are very numerous and all pigments hitherto examined proved that this method functions very well. Dispersions especially homogeneous and fine with regard to grain may be obtained from inorganic pigments, for instance manganese oxides, cadmium sulfide, lead chromate, titanium dioxide, vivianite, chromium oxide and other mineral colors, sulfur, magnesium oxide, zinc sulfide, mercury iodide, silver bromide and other difficultly soluble silver salts, for instance for the manufacture of light-sensitive emulsions, basic bismuth nitrate and the like. The organic pigments which were also examined and also show an excellent degree of division after the treatment are quite numerous. There may be employed for instance the numerous pigments obtained from vat- and azo-dyestuffs in the form of a paste or powder, phthalocyanine and similar compounds, also their chlorinated products and metal compounds, soot, color lakes and precipitation products of soluble dyestuffs of basic or acid nature with precipitants of a respective opposite nature, dyestuffs for coloring cellulose esters and ethers, furthermore intermediate products of the organic industry like dyestuff components (also in precipitated form), remedies and agents for the extermination of animal and vegetable pest.

The products may serve according to the variety of the pigments employed for different purposes, for instance for coloring colloids, dissolved in water or organic solvents from which artificial filaments, films, surface coatings, paints and lacquers are manufactured or for coloring plastic and thermoplastic masses, also for the production of dyestuffs for print- and dyeworks; finally also for remedies, for instance toothpaste, photographic products and agents for the extermination of animal and vegetable pest.

*Example*

In a kneading machine after the principle of Werner & Pfleiderer there are kneaded 30 parts of gelatin with 25 parts of water, 25 parts of the commercial dyestuff Fanal-Red 6B supra (paste) and 10 parts of a product consisting chiefly of 1,3,5,7-tetraoxyoctane. 40 parts powdered gelatin are gradually added to this mass and the whole mixture is then kneaded for two hours, diluted with water and cast onto glass plates. The mass yields a clear transparent filter. Without adding tetrahydroxyoctane only a turbid, useless filter is obtained.

What we claim is:

1. A process for producing colloidal pigment material which comprises dispersing a pigment in a liquid polyhydric alcohol selected from the class consisting of triols and tetrols of hexane and octane by subjecting a pigment in a plastic state to an intense mechanical treatment by means of a kneading and rolling process in the presence of said liquid polyhydric alcohol.

2. Pastes of colloidal pigments dispersed in a liquid polyhydric alcohol selected from the class consisting of triols and tetrols of hexane and octane.

3. The process of claim 1, in which a diluent selected from the class consisting of water and organic solvents is added to the pigment and dispersing agent.

4. The process as defined in claim 1, wherein the dispersing agent is 1,3,5-trihydroxyhexane.

5. The process as defined in claim 1, wherein the dispersing agent is 1,3,5,7-tetrahydroxyoctane.

6. The process as defined in claim 1, wherein the dispersing agent is a mixture of 1,3,5-trihydroxyhexane and 1,3,5,7-tetrahydroxyoctane.

GEORG BÖHNER.
BRUNO WENDT.
JOHN EGGERT.